United States Patent [19]

Latchinian

[11] Patent Number: 4,473,315
[45] Date of Patent: Sep. 25, 1984

[54] FURNITURE EDGE ASSEMBLY

[76] Inventor: Jim S. Latchinian, 16 Rue Jean Bologne, Paris, 75016, France

[21] Appl. No.: 304,382

[22] Filed: Sep. 22, 1981

[51] Int. Cl.³ .................. F16D 1/00; F16G 11/00
[52] U.S. Cl. ................................ 403/172; 403/217; 52/280
[58] Field of Search ............... 403/171, 176, 217, 219, 403/231, 297, 373, 406, 172; 52/280, 288, 718, 585, 586

[56] References Cited

U.S. PATENT DOCUMENTS

| | | | |
|---|---|---|---|
| 3,144,265 | 8/1964 | Humble | 403/219 |
| 3,601,430 | 8/1971 | Zwennis | 403/406 |
| 3,859,767 | 1/1975 | Aspenwall | 403/217 |
| 3,866,364 | 2/1975 | Pollard | 52/36 |
| 4,078,847 | 3/1978 | Presnick | 403/171 X |

Primary Examiner—Dennis L. Taylor
Attorney, Agent, or Firm—Oltman and Flynn

[57] ABSTRACT

On an article of furniture an edge assembly is provided which has three edge pieces extending along mutually perpendicular edges of the furniture article forming a corner. Each edge piece in the vicinity of the corner has an insert spine which forms the backbone of the three edge pieces and contours the latter into a plumb and crisp corner assembly. The edge piece and insert spine represent parallel threaded openings which receive socket-set Allen Screws. These Allen Screws are embedded in the threaded openings of the edge pieces at the time of assembly in order to engage and lock the edge pieces into a permanent and secure corner assembly.

13 Claims, 17 Drawing Figures

FURNITURE EDGE ASSEMBLY

RELATED APPLICATION

This application is an improvement over my copending U.S. patent application Ser. No. 06/202,191 filed Oct. 30, 1980, now U.S. Pat. No. 4,334,796.

BACKGROUND OF THE INVENTION

The increased desire of a large segment of the population to reduce expenses encountered in furniture purchases created a demand for a known and reliable apparatus for home assembly of furniture. In addition the furniture industry in an era of rising transportation expenditure requires an apparatus which can reduce shipping expenses by allowing furniture to be shipped unassembled from the manufacturer or wholesaler and assembled at the retail location.

To meet the above need the following application has been proposed.

For example, U.S. patent application Ser. No. 06/202,191 to Latchinian shows a furniture edge assembly which is a combination of an edge piece and corner piece insert. The corner pieces are fastened to the edge pieces at each corner by means of a sheet metal screw which facilitates the assembly of furniture composed of panel surfaces meeting of 90° angles.

SUMMARY OF THE INVENTION

This invention relates to an edge assembly for an article of furniture, such as a table, cabinet, wall unit, showcase, breakfront, set of book shelves or other serviceable home furnishing.

In accordance with the present invention, exposed edges of an article of furniture are covered by edge pieces which are locked in place by Allen Screws embedded in an internal corner fastener. The edge piece assembly preferably is part of the structural framework of the furniture article.

A principle object of this invention is to provide a novel, unique and improved edge assembly for an article of furniture.

Another object of this invention is to provide such an edge assembly which may be used on a variety of different furniture articles.

Another object of this invention is to provide a novel assembly which constitutes a protective and decorative edging for an article of furniture as well as part of the structural framework of the furniture article.

Another object of this invention is to provide an edge piece which facilitates the assembly of an article of furniture.

Another object of this invention is to provide an edge piece which requires a minimum of instruction to employ in the assembly of an article of furniture.

Another object of this invention is to provide an edge piece which has demonstrated reliability in the assembly and use of an article of furniture.

Further objects and advantages of this invention will be apparent from the following detailed description of a presently preferred embodiment thereof, shown in the accompanying drawings.

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

DETAILED DESCRIPTION

Figure 7:
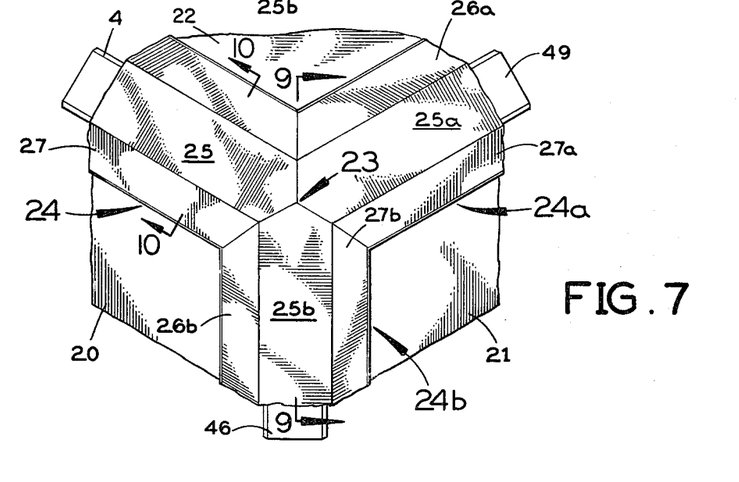
FIG. 7 is a cut-away view similar to FIG. 6 from the outside of the corner of a furniture article having the present insert spine protruding beyond the point of fragmentation.

Referring to FIG. 7, the edge assembly of the present invention is shown in place on an article of furniture having flat, perpendicularly disposed, vertical side panels 20 and 21 and a flat, horizontal top panel 22. The three panels meet at a three-edged corner 23.

In accordance with the present invention, the horizontal edge where side panel 20 and the top panel 22 adjoin each other is covered by a first edge piece 24 which, in the embodiment shown, presents a flat outer wall 25 extending diagonally at a 45° angle between these panels, a top flange 26 which overlies the top panel 22, and a bottom flange 27 which extends down the outside of side panel 20. The horizontal edge where the top panel 22 adjoins the other side panel 21 is similarly covered by a second edge piece 24a, which has a flat outer wall 25a extending diagonally between these panels at a 45° angle to each, a top flange 26a overlying the top panel 22, and a bottom flange 27a extending down the outside of side panel 21. The vertical edge where the side panels 20 and 21 adjoin each other is similarly covered by a third edge piece 24b, which has a flat outer wall 25b extending diagonally between these panels at a 45° angle to each, a side flange 26b extending down the outside of side panel 20, and a side flange 27b extending down the outside of side panel 21.

As shown in FIG. 7, at the corner 23 of the furniture piece the outer walls 25, 25a and 25b of the respective edge pieces 24 and 24a and 24b terminate in V-shaped edges, each having the opposite sides of the "V" 120° apart. These V-shaped edges of the outer walls mate snugly with each other at the outside of corner 23, as shown in FIG. 7, when the assembly is completed. Similarly, at the corner 23 the inner walls 35, 35a and 35b of the respective corner pieces terminate in V-shaped edges which snugly engage each other at the inside of corner 23.

Figure 8:
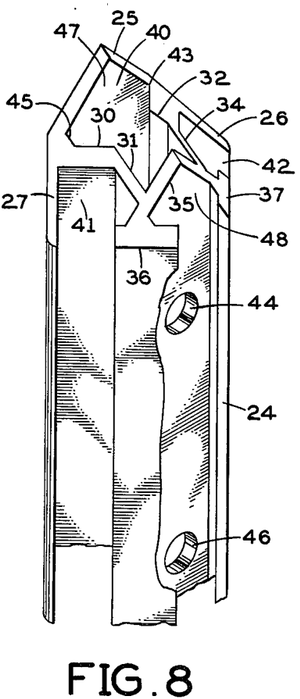
FIG. 8 is a perspective view showing the cross-section construction of one of three edge pieces composing the present assembly.
Figure 9:
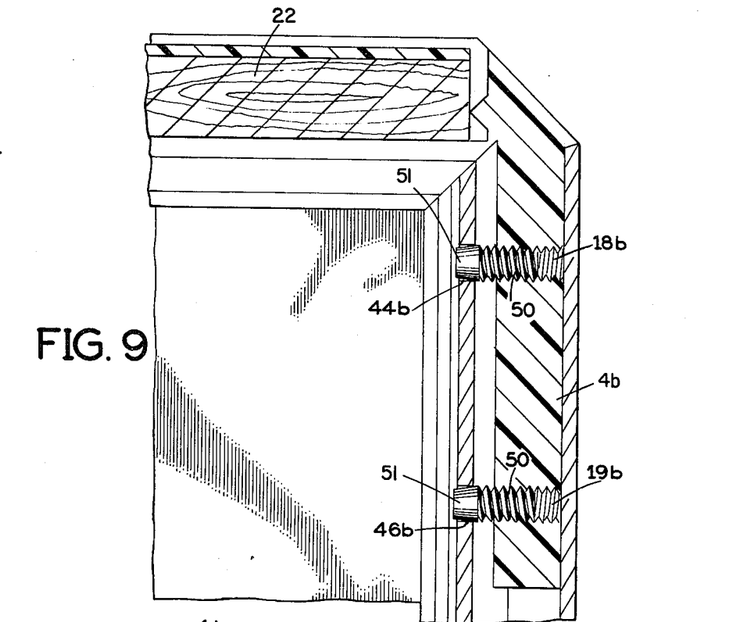
FIG. 9 is a vertical section taken along the line 9—9 in FIG. 7.

The three edge pieces 24, 24a and 24b are of similar construction, the cross-section of which is shown in FIG. 8 for the edge piece 24. Each of the edge pieces preferably is an aluminum extrusion.

Figure 10:
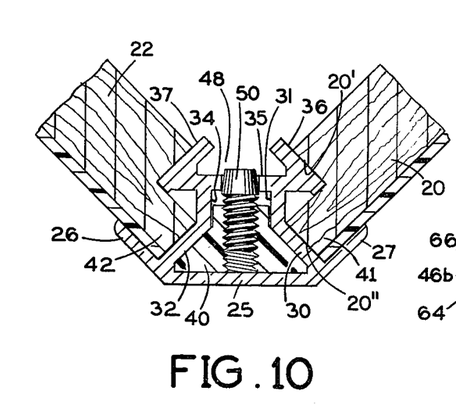
FIG. 10 is a horizontal section taken along the line 10—10 in FIG. 7.

At the corner between the diagonal outer wall 25 and the vertical bottom flange 27 of edge piece 24, an internal flat wall 30 (FIGS. 6, 8 and 10) extends inward perpendicular to flange 27 and at 45° to outer wall 25. At the corner between outer wall 25 and the horizontal top flange 26 of edge piece 24, a similar flat internal wall 32 extends inward perpendicular to flange 26 and at 45° to outer wall 25. The internal walls 30 and 32 extend perpendicular to each other and converge toward each other away from the opposite longitudinal edges of the diagonal outer wall 25 but they do not intersect. At its inner end, wall 30 is joined to a flat wall 31 which extends perpendicular to the diagonal outer wall 25 and away from it, as best seen in FIG. 10. A similar flat wall 34 extends from the inner end of wall 32 perpendicular to the outer wall 25 and away from it, parallel to wall 31. An inner wall 35 extends perpendicularly between the inner ends of walls 31 and 34 and parallel to the diagonal outer wall 25.

Along the entire length of edge piece 24 except in the immediate vicinity of the three-sided corner 23 where it meets the other two edge pieces 24a and 24b, the walls 25, 30, 32, 31, 34 and 35 define a longitudinal recess 40 which is open at the opposite ends of the edge piece. The diagonal inner wall 35 of the edge piece has two circular openings 44 and 46 (FIG. 8) which lead into the recess 40 at spaced locations along the length of the edge piece. In cross-section (FIG. 10) the recess 40 is of truncated, substantially triangular form between the outer wall 25 and walls 30 and 32, and it is of smaller rectangular cross-section between walls 31 and 34 and inner wall 35.

Figure 6:
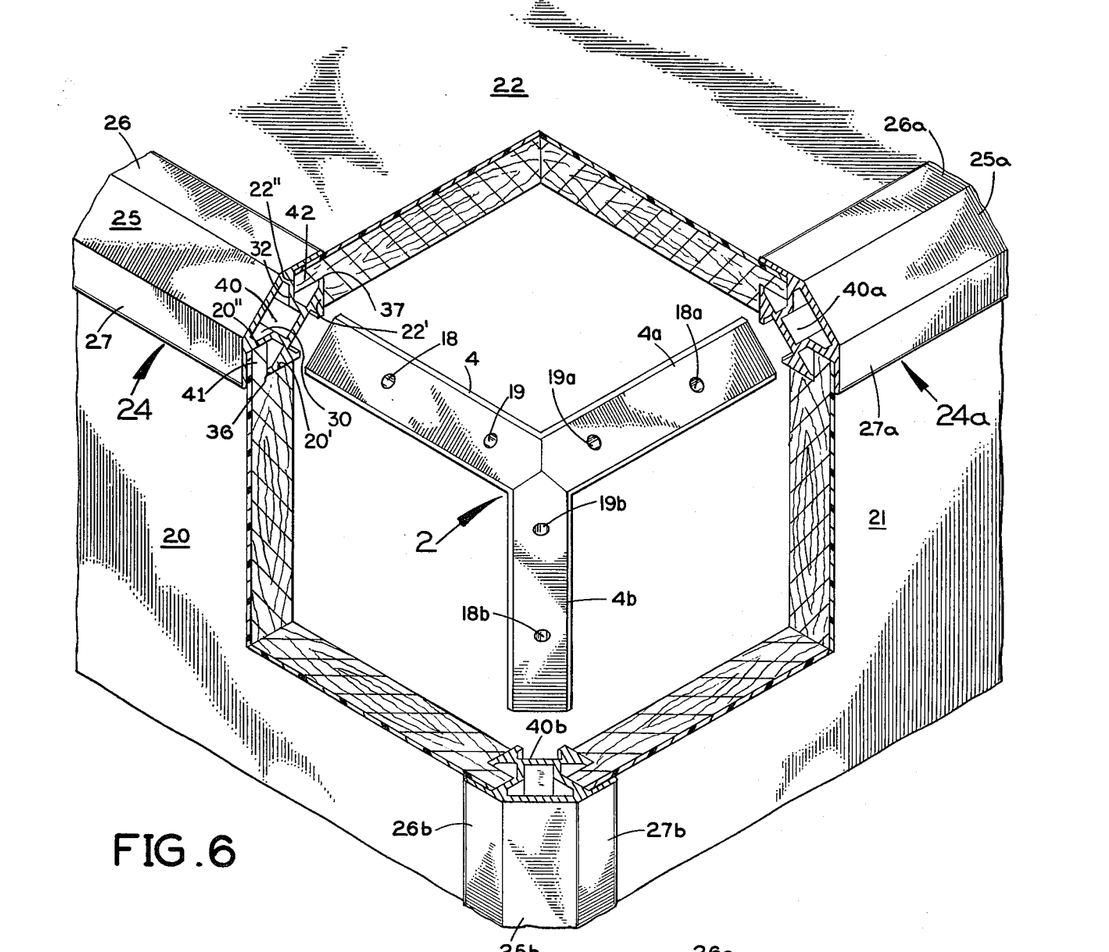
FIG. 6 is a fragmentary perspective view detailing the inside of the corner of a furniture article showing the present insert spine positioned thereon, with certain parts removed and broken away for clarity.

At the corner between its walls 34 and 35, edge piece 24 presents a flat inner segment 37 extending vertically inward in FIG. 6 beyond inner wall 35 at a 45° angle to the latter and perpendicular to the top flange 26. At the corner between its walls 31 and 35, edge piece 24 presents another flat inner segment 36 extending horizontally beyond inner wall 35 in FIG. 6 at an opposite 45° angle and perpendicular to the bottom flange 27 on the edge piece. The inner segments 36, 37 and the inner wall 35 define a channel 48 which is open along the inside of the edge piece 24.

As shown in FIG. 6, behind its vertical bottom flange 27 the edge piece 24 defines a channel 41 located below its longitudinal recess 40 and open along the bottom of this edge piece. The front of channel 41 is defined by the rear face of flange 27. The rear of channel 41 at the bottom is defined by the front edge of inner segment 36. Along the top at the inside, the side panel 20 of the article of furniture is formed with a rectangular undercut or groove where it presents an upwardly-facing horizontal face 20' which engages the bottom of inner segment 36 of edge piece 24. Outward from this face 20' the side panel 20 projects up snugly into channel 41 between the rear of flange 27 and the front edge of inner segment 36 and it terminates in a horizontal top face 20" which engages the internal wall 30 of edge piece 24 from below.

Similarly, below its horizontal top flange 26 the edge piece 24 defines a channel 42 located behind its longitudinal recess 40 and open along the back of this edge piece. The top of channel 42 is defined by the bottom face of flange 26. The bottom of channel 42 is defined by the top edge of inner segment 37. Along the bottom at the front, the top panel 22 of the article of furniture is formed with a rectangular undercut or groove where it presents a forwardly-facing vertical face 22' which engages the exposed rear face of inner segment 37 of edge piece 24. Above this face 22' the furniture panel 22 projects horizontally forward snugly into channel 42 between the top edge of inner segment 37 and the bottom of flange 26 and it terminates in a vertical front face 22" which engages the internal wall 32 of edge piece 24 from behind.

Elements of the edge piece 24a which correspond to elements of the first edge piece 24 are given the same reference numerals, but with an "a" suffix added and similar elements of edge pieces 24b contain a "b" suffix added and 24c contain a "c" suffix added.

FIGS. 1, 2, 3 and 4 show the spinal insert 2 composed of legs 4, 4a and 4b.

The three legs 4, 4a and 4b are joined to each other and each of them extends perpendicular to the other two in the same directions as the corresponding edge pieces 24, 24a and 24b. Each of the legs of the spinal insert 2 is shaped substantially complementary to longitudinal recess 40 in the corresponding edge piece, as shown in FIG. 10, so as to be slidably insertable into that recess from the end of that side piece which will be located at the corner 23 in FIG. 7. As shown in FIG. 10, the thickness of each leg of the spinal insert diagonally inward from the outer wall 25 of the edge piece is less than the diagonal depth of the edge piece recess 40 between the outer wall 25 and the inner wall 35 so that there is a substantial clearance between the inner edge of the spinal insert leg and the inner wall 35 of the edge piece. There is substantially no clearance (only enough for a sliding fit) between the spinal insert leg 4 and the walls 25, 30 and 32 of the edge piece which define the truncated, generally triangular outer half of its recess 40.

The leg 4 of spinal insert 2 if formed with two longitudinally spaced, screw-threaded openings 18 and 19 which are the same distance apart from each other as the openings 46 and 44 in the inner wall 35 of the corresponding edge piece 24. The axis of each screw-threaded opening 18 or 19 in leg 4 of the spinal insert extends perpendicular to the outer and inner walls 25 and 35 of the corresponding edge piece 24 when that leg of the spinal insert is received in the longitudinal recess 40 in the edge piece. The other two legs 4a and 4b of the spinal insert have similar openings 18a, 18b and 19a, 19b, respectively, which are the same distance apart as the openings 46a, 44a and 46b, 44b in the corresponding edge pieces 24a and 24b. When the three edge pieces 24, 24a and 24b are in snug engagement with each other at the three-sided corner 23 of the article of furniture, as shown in FIG. 7, the following openings in the legs of the spinal insert and the corresponding side pieces register exactly with each other: 18 and 46, 19 and 44, 18a and 46a, 19a and 44a, 18b and 46b, and 19b and 44b.

Figures 1, 2, 3, 5:
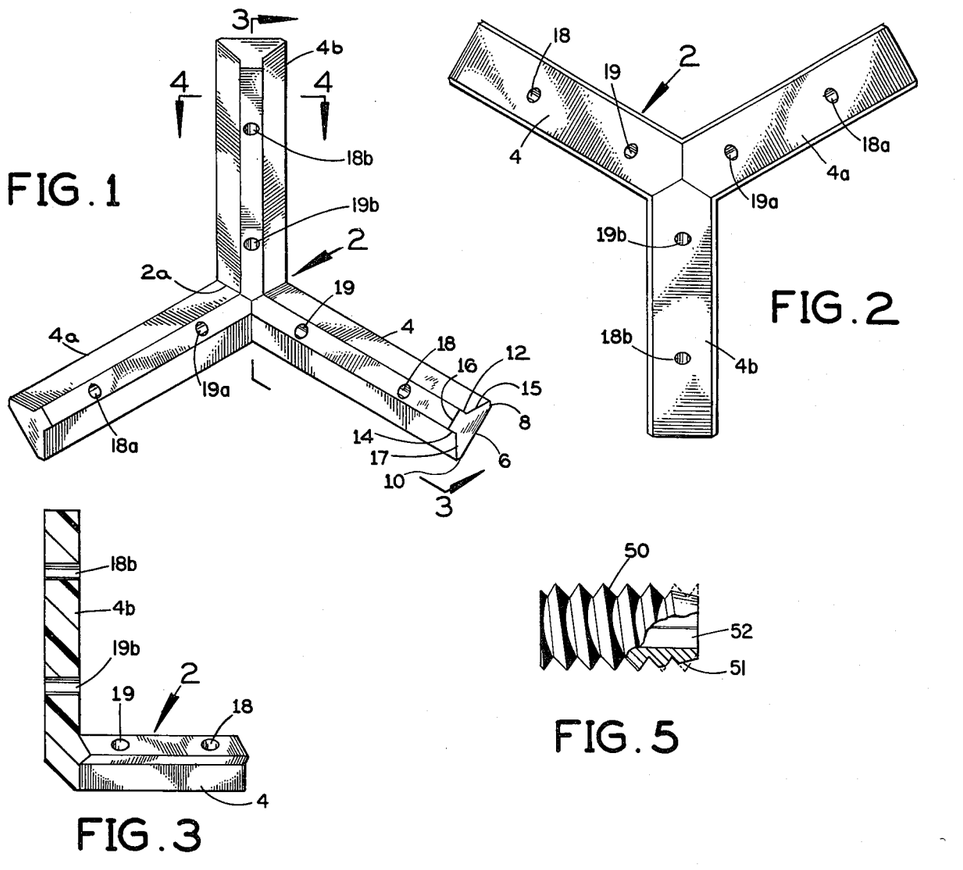
FIG. 1 is a perspective view of the insert spine utilized to form and lock the corner of the furniture article constructed in accordance with the present invention.
FIG. 2 is a perspective view of the same insert spine inverted from the FIG. 1 position.
FIG. 3 is a section taken along the line 3—3 in FIG. 1 through two legs of the insert spine.
FIG. 5 is an Allen Screw employed in fastening the internal spinal to the edge pieces in order to lock the latter into the shape of a corner assembly.
Figure 4:
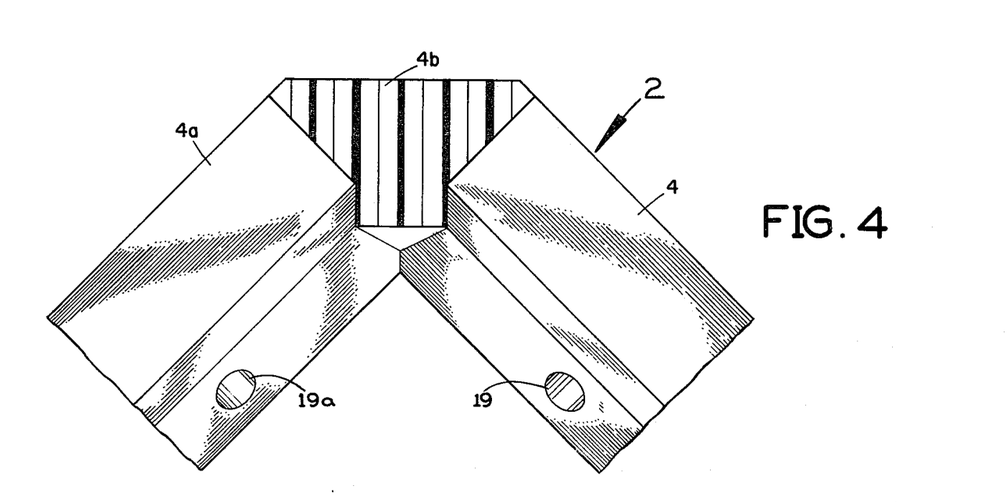
FIG. 4 is a cross-section through one leg of the insert spine, taken along the line 4—4 in FIG. 1.

Each of the screw-threaded openings 18, 19, 18a, 19a, 18b and 19b in the spinal insert 2 threadedly receives a corresponding Allen screw 50 as shown in FIGS. 9–12. As shown in FIG. 5, each screw has a frusto-conical periphery 51 at its inner end (i.e., the end away from the outer wall 25, 25a, or 25b of the corresponding edge piece 24, 24a or 24b), which is formed by machining away the screw threads at this end of the screw. At this frusto-conical end the cross-sectional size of the screw diminishes progressively toward its inner end. A hexagonal socket 52 is open at this end of the screw to permit the insertion of a complementary wrench for turning the screw.

Figure 11:
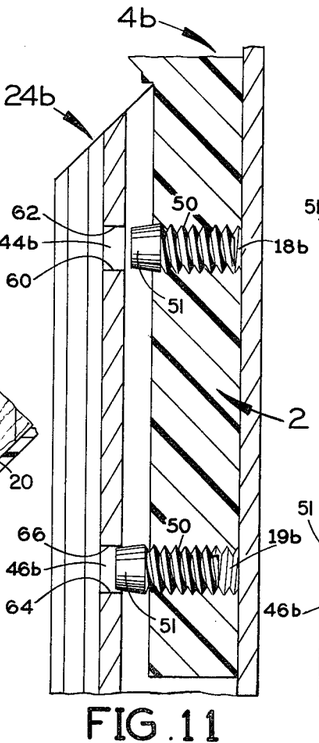
FIG. 11 is a view similar to FIG. 9 with the Allen Screws telescoped into the spinal insert.
Figure 12:
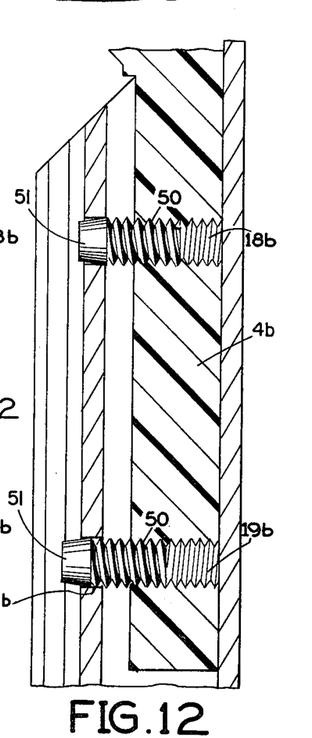
FIG. 12 is a view similar to FIG. 9 with the Allen Screws extended into the abutting edge piece.
Figure 13:
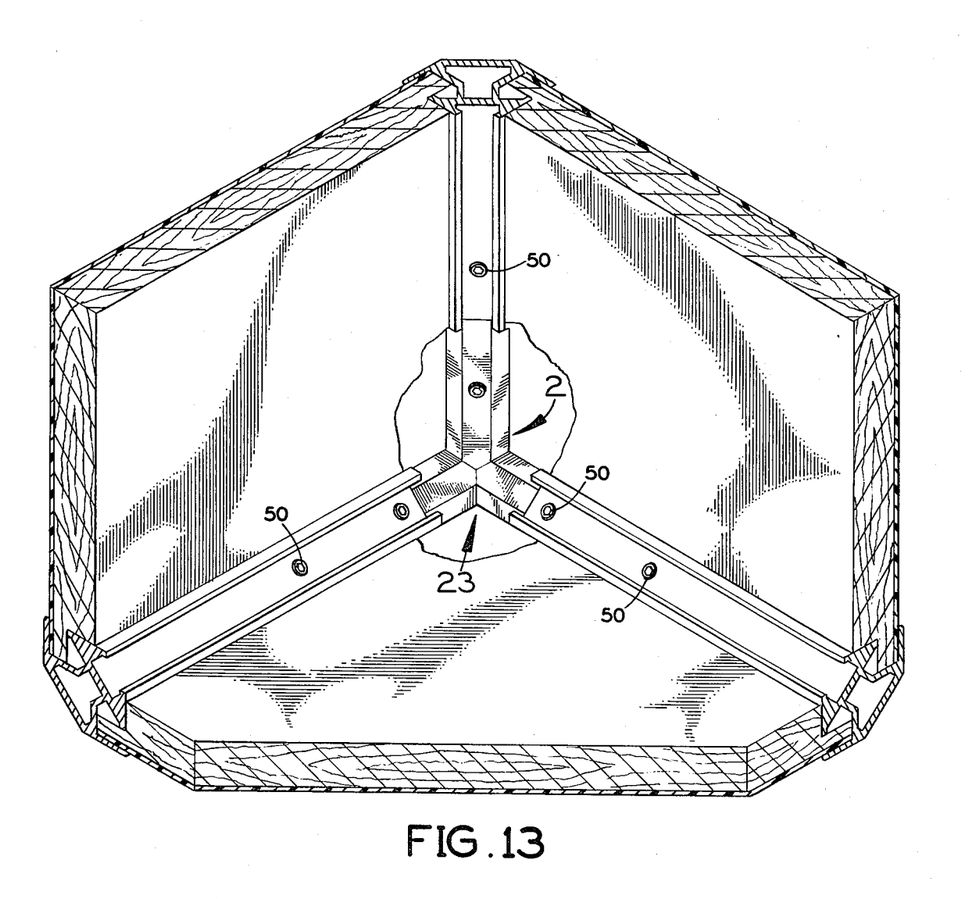
FIG. 13 is a fragmentary perspective view from the inside of the corner of a furniture article detailing the union and locking of the three edge pieces by means of Allen Screws which extend from the interior surfaces of the edge pieces.

As shown in FIGS. 11 and 12, this frusto-conical end 51 of the screw can enter the corresponding circular opening (e.g., 44b or 46b) in the adjacent corner piece but it cannot pass completely through it, so that the screw cannot be removed from the spinal insert 2. The extreme inner end of the screw is slightly smaller than the corner piece opening so that it can enter this opening even if the corner piece opening is not precisely centered with respect to the screw, which may be the case when the corner pieces 24, 24a and 24b are first assembled onto the spinal insert 2. When such assembly takes place, all of the screws 50 will have been screwed far enough into the respective legs 4, 4a and 4b of the spinal insert 2 to permit the slidable insertion of the edge pieces 24, 24a and 24b over the legs of the spinal insert. In FIG. 11 the upper screw 50 is shown in this clearance position.

After the edge pieces 24, 24a and 24b have been slid onto the corresponding legs 4, 4a and 4b of the insert spine 2, and with the openings in the diagonal inner walls 35, 35a and 35b of the edge pieces substantially aligned with the retracted screws 50 in the insert spine, a wrench now is inserted into the exposed socket 52 of each screw and the screw is rotated in a direction to draw it inwardly of the assembly (to the left in FIG. 11) so that its narrow end enters the corresponding opening in the edge piece. Continued turning of the screw in this direction causes its frusto-conical surface to wedge against the side of the edge piece opening which is closest to the corner 23, so that the edge piece is forced toward this corner. This action continues until the tapered inner end of the screw reaches the position shown at the lower opening 46b in FIG. 12, where it has an interference fit which prevents any further withdrawal of the screw from the corresponding leg of the spinal insert 2.

Each screw 50 is tightened enough to force the flat outer face of the corresponding leg 4, 4a or 4b tightly against the flat inside face of the outer wall 25, 25a or 25b of the corresponding edge piece 24, 24a or 24b. This is shown in FIG. 10 for the edge piece 24. This adjustment of the Allen screws 50 effectively joins the three edge pieces 24, 24a and 24b to the spinal insert 2 and wedges the edge pieces snugly against each other at the corner 24 of the article of furniture.

It will be evident that the screws 50, when retracted into the insert spine 2, enable the edge pieces 24, 24a and 24b to be easily slid lengthwise onto the corresponding legs of the insert spine, after which the screws may be extended diagonally inward from the respective legs of the insert spine to clamp the edge pieces on these legs and wedge the edge pieces into snug engagement with each other at the corner 23.

Figure 14:
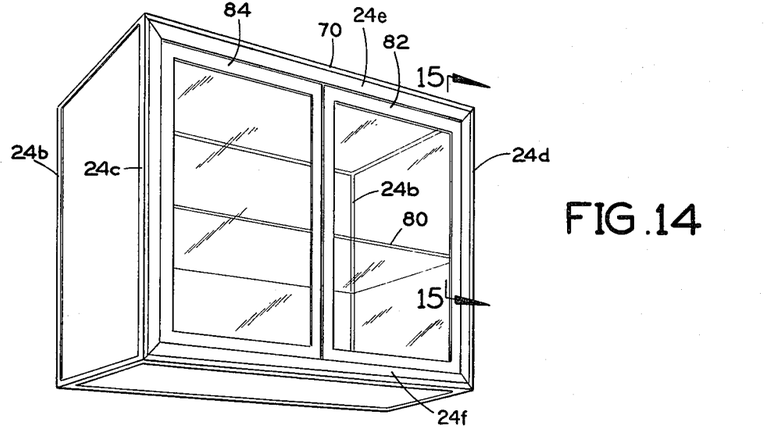
FIG. 14 is a perspective view of a showcase assembled utilizing the present furniture edge assembly invention with a variable positioned shelf.

FIGS. 14–17 show a cabinet embodying the present edge construction and having a shelf support which is vertically adjustable along a vertical edge piece 24d at the front (FIG. 14).

Figure 17:
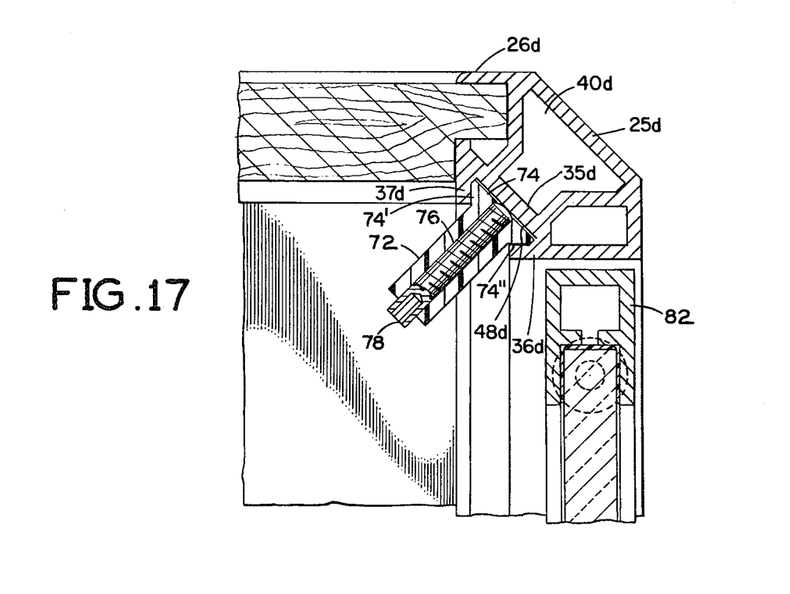
FIG. 17 is a horizontal section taken along the line 17—17 in FIG. 15.

As shown in FIG. 17, this vertical edge piece now presents a channel 48d which is located diagonally inward from the inner wall 35d and is open at the inside of this edge piece. Channel 48d is formed by the diagonal inner wall 35d of the vertical corner piece 24d and the vertical inner segments 36d and 37d which project at opposite 45° angles inward from wall 35d. A shelf support 72 (FIG. 16) has a widened outer end 74 which can be slidably inserted into channel 48d from either end of the edge piece 24d. The shelf support extends diagonally inward from the vertical edge piece 24d and presents a flat, horizontal top face 72' (FIG. 15) for engagement beneath a shelf 80 inside the cabinet.

The shelf support 72 is formed with a screw-threaded horizontal opening 76 which extends completely through it perpendicular to the inner wall 35d of edge piece 24d. The widened outer end of shelf support 72 has opposite vertical side faces 74' and 74" (FIG. 16) which project outward at opposite 45° angles to the axis of the screw-threaded opening 76 in the shelf support. As shown in FIG. 17, these side faces are located respectively next to the segments 37d and 36d of edge piece 24d on opposite sides of channel 48d. An Allen screw 78 with a hex socket in its inner end is threadedly received in the shelf support opening 76. This screw may be adjusted to bear tightly against the inner wall 35d of the edge piece 24d and wedge the opposite side faces 74' and 74" of the enlarged outer end 74 of shelf support 72 tightly against the sides 37d and 36d of channel 48d to lock the shelf support 72 in the desired position along the vertical edge piece 24d of the cabinet.

Similar vertically adjustable shelf supports may be provided inside each of the other vertical corners of the cabinet.

As shown in FIG. 14, the cabinet has two front doors 82 and 84 which are pivoted near their right and left edges, respectively.

Figures 15, 16:
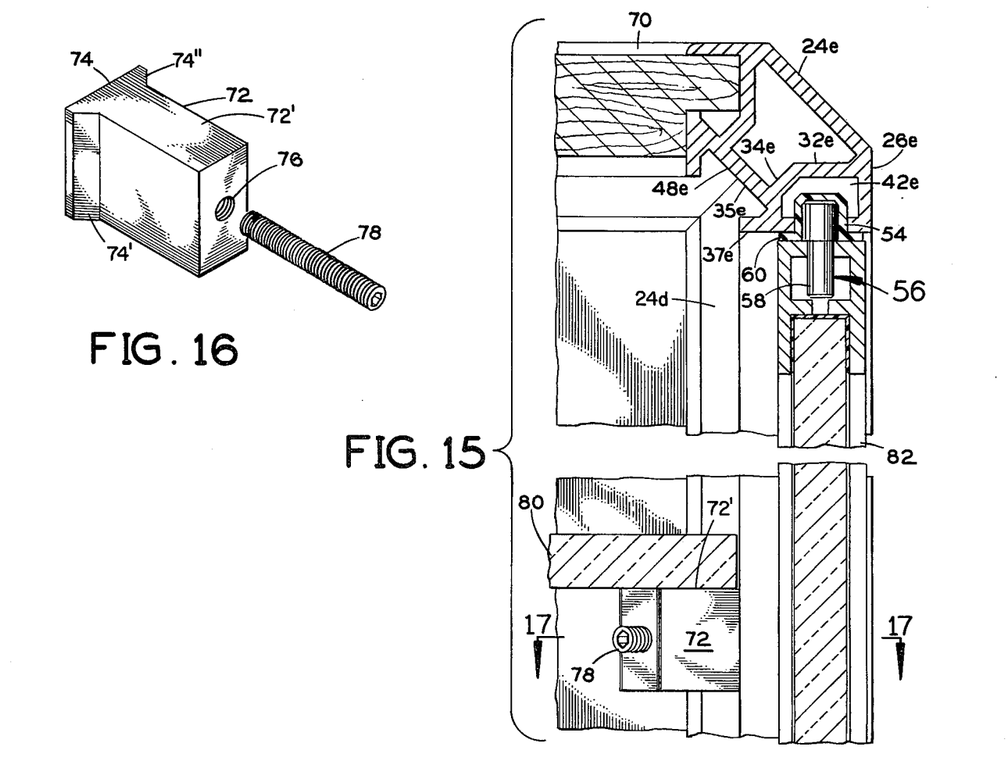
FIG. 15 is a vertical section taken along the line 15—15 in FIG. 14.
FIG. 16 is a perspective view of a shelf support and fastener utilized to latitudinally locate the internal shelf.

Referring to FIG. 15, the door 82 carries a pivot pin 56 at the top which projects up into a cap 54 having a horizontal annular flange 60 on the bottom which is engaged snugly between the top of door 82 and the bottom 37e of the top front edge piece 24e of the cabinet. The cap 54 extends up through an opening in the bottom wall 37e of edge piece 24e and into a recess 42e in this edge piece.

A similar pivot arrangement acts between the bottom of door 82 and the horizontal edge piece 24f (FIG. 14) which extends along the bottom of the cabinet at the front. This bottom pivot is a mirror image of the top pivot shown in FIG. 15 and is vertically aligned with it.

From the foregoing, it will be evident that the present invention constitutes a novel, unique and convenient means of providing protective, secure and decorative edging on an article of furniture, with the edge pieces held together against adjoining panels of the furniture article by a readily insertable insert spine and Allen Screws. Preferably, the edge pieces, insert spines and Allen Screws are part of the structural framework of the furniture article.

With the present edge assembly, the article of furniture can be shipped in a disassembled "knocked-down" condition at a very substantial saving in transportation and storage cost. The knocked-down article of furniture can be readily assembled by an unskilled person in a relatively short time because of the novel, unique and convenient manner in which the present edge assembly may be completed as previously described. When the edge pieces of the present edge assembly are in place they protect the edges of the furniture article against damage, as well as enhancing the decorative beauty of the furniture article. An edge piece which requires replacement can be removed simply by unscrewing the two Allen Screws holding it assembled at the respective corners of the furniture article where the edge piece is located. Consequently, a furniture article having one or more damaged edge pieces can be rejuvenated by replacing the damaged edge pieces, which can be done by an unskilled person, such as the owner of the furniture article. Also, the panels (e.g. 20, 21 and 22) of the furniture article are readily replaceable in the event that wear-and-tear or changing fashions make such replacement desirable. In all embodiments the materials selected for each element can vary according to their availability, cost or structural requirements.

I claim:

1. In an edge assembly kit for attachment to an article of furniture having mutually transverse edges adjoining each other at a corner, said edge assembly kit including:
   edge pieces respectively adapted to be fitted along the edges of the article of furniture which form said corner;
   and a unitary insert spine having mutually transverse legs which adjoin each other at their inner ends;
   each of said edge pieces having a longitudinal recess which is open at one end of the respective edge piece;
   each edge piece having a longitudinal inner wall extending along the inner side of said recess at the inside of said edge piece, said inner wall having at least one opening therein;
   each of said legs of the insert spine being slidably insertable into the longitudinal recess of a corresponding edge piece at said open end of the latter and having a snug fit in said recess:
the improvement which comprises:
   at least one screw threadedly received in each leg of the insert spine at the location of said opening in the corresponding edge piece for selective screw-threaded adjustment inward from said leg of the insert spine into said opening in the corresponding edge piece, said screw having an interference fit in said opening to limit its screw-threaded adjustment inward from said leg of the insert spine and thereby force said leg of the insert spine and the corresponding edge piece into tight engagement with each other at said longitudinal recess in the edge piece.

2. An edge assembly kit according to claim 1, wherein:
   each leg of the insert spine carries at least two of said screws spaced apart longitudinally of said leg;
   and each of said edge pieces has at least two of said openings in its inner wall at the same position along its length as said screws in the corresponding leg of the insert spine.

3. An edge assembly kit according to claim 2, wherein:
   each of said openings in the edge pieces has a circular cross-section;
   and the inner end of each screw is frustoconical and is dimensioned to enter but not pass completely through the corresponding opening in the corresponding edge piece.

4. An edge assembly kit according to claim 1, wherein:
   each of said openings in the edge pieces has a circular cross-section;
   and the inner end of each screw is frustoconical and is dimensioned to enter but not pass completely through the corresponding opening in the corresponding edge piece.

5. An edge assembly kit according to claim 1, wherein:
   at least one of said edge pieces has a channel extending along its length on one side of said longitudinal recess, said channel being closed at the side thereof adjacent said longitudinal recess and open at the side thereof away from said longitudinal recess for snugly receiving a corresponding panel of the article of furniture.

6. An edge assembly kit according to claim 1, wherein:
   at least one of said edge pieces has two channels extending along its length respectively on opposite sides of said longitudinal recess, each of said channels being closed at the side thereof adjacent said longitudinal recess and open at the side thereof away from said longitudinal recess for receiving a corresponding panel of the article of furniture.

7. An edge assembly kit according to claim 2, wherein:
   each edge piece presents a flat outer wall of its longitudinal recess extending perpendicular to the corresponding screws;
   and each leg of the insert spine presents a flat outer face which is forced into tight engagement with said outer wall of the corresponding edge piece when the screws in that leg are threadedly adjusted inward from said leg.

8. An edge assembly kit according to claim 7, wherein:
   said inner wall of the longitudinal recess in each edge piece extends parallel to said outer wall of that recess.

9. An edge assembly kit according to claim 1, wherein:
   three of said edge pieces extend perpendicular to each other to form a three-sided corner;
   said insert spine has three mutually perpendicular legs which are respectively received in said longitudinal recesses in the three edge pieces;
   and at least one of said edge pieces has two channels extending along its length respectively on opposite sides of said longitudinal recess, each of said channels being closed at the side thereof toward said longitudinal recess and open at the side thereof away from said longitudinal recess for receiving a corresponding panel of the article of furniture.

10. An edge assembly kit according to claim 9, wherein:

each edge piece presents a flat outer wall of its longitudinal recess extending perpendicular to the corresponding screws;

and each leg of the insert spine presents a flat outer face which is forced into tight engagement with said outer wall of the corresponding edge piece when the screws in that leg are threadedly adjusted inward from said leg.

11. An edge assembly kit according to claim 10, wherein:

said inner wall of the longitudinal recess in each edge piece extends parallel to said outer wall of that recess.

12. An edge assembly kit according to claim 11, wherein:

one of said edge pieces extends vertically and presents a channel which is located inward from said inner wall of the longitudinal recess in that edge piece and is open along the inside of that edge piece;

and further comprising:

a shelf support slidably received in said channel and projecting horizontally inward from said vertically extending edge piece, said shelf support having a horizontal screw-threaded opening therein extending completely through the shelf support perpendicular to said inner wall of the longitudinal recess in that edge piece;

and a screw threadedly received in said screw-threaded opening in the shelf support and threadedly adjustable therein into tight engagement with said inner wall to lock the shelf support in place along said vertically extending edge piece.

13. An edge assembly kit according to claim 1, wherein:

one of said edge pieces extends vertically and presents a channel which is located inward from said inner wall of the longitudinal recess in that edge piece and is open along the inside of that edge piece;

and further comprising:

a shelf support slidably received in said channel and projecting horizontally inward from said vertically extending edge piece, said shelf support having a horizontal screw-threaded opening therein extending completely through the shelf support perpendicular to said inner wall of the longitudinal recess in that edge piece;

and a screw threadedly received in said screw-threaded opening in the shelf support and threadedly adjustable therein into tight engagement with said inner wall to lock the shelf support in place along said vertically extending edge piece.

* * * * *